United States Patent
Logvinov et al.

(10) Patent No.: US 8,275,144 B2
(45) Date of Patent: Sep. 25, 2012

(54) INTELLIGENT AUDIO SPEAKERS

(75) Inventors: Oleg Logvinov, East Brunswick, NJ (US); Brion John Ebert, Easton, PA (US)

(73) Assignee: STMicroelectronics, Inc., Coppell, TX (US)

( * ) Notice: Subject to any disclaimer, the term of this patent is extended or adjusted under 35 U.S.C. 154(b) by 103 days.

(21) Appl. No.: 11/692,184

(22) Filed: Mar. 27, 2007

(65) Prior Publication Data

US 2008/0056507 A1   Mar. 6, 2008

Related U.S. Application Data

(66) Substitute for application No. 60/786,460, filed on Mar. 28, 2006.

(51) Int. Cl.
*H04B 3/00* (2006.01)
*G05B 11/01* (2006.01)

(52) U.S. Cl. .............. 381/77; 381/124; 340/310.11

(58) Field of Classification Search .............. 381/77, 381/82, 105; 362/86; 340/310.11
See application file for complete search history.

(56) References Cited

U.S. PATENT DOCUMENTS

| | | | | |
|---|---|---|---|---|
| 5,210,467 A * | 5/1993 | Nagashima | .................... | 315/158 |
| 5,406,634 A * | 4/1995 | Anderson et al. | ................ | 381/82 |
| 6,778,869 B2 * | 8/2004 | Champion | ....................... | 700/94 |
| 6,978,030 B2 * | 12/2005 | Reich | .............................. | 381/124 |
| 7,099,483 B2 * | 8/2006 | Inagaki | ............................ | 381/77 |
| 7,106,177 B2 | 9/2006 | Logvinov et al. | | |
| 7,529,377 B2 * | 5/2009 | Nackvi et al. | .................. | 381/103 |
| 2007/0022197 A1 | 1/2007 | Logvinov et al. | | |

* cited by examiner

*Primary Examiner* — Xu Mei
(74) *Attorney, Agent, or Firm* — Slater & Matsil, L.L.P.

(57) ABSTRACT

An intelligent audio speaker that uses a power line communication element to provide audio distribution within homes, businesses, apartment complexes, and other buildings. Multiple intelligent audio speakers may be networked together, with common control. The intelligent audio speaker may, in some embodiments of the present invention, contain enhanced ambient backlight effects to further enhance the listener's experience. In some embodiments of the present invention, an existing audio speaker is retrofitted to an intelligent audio speaker using a retrofit kit.

56 Claims, 9 Drawing Sheets

INTELLIGENT AUDIO SPEAKERS

CROSS-REFERENCE TO RELATED PATENT APPLICATIONS

This application claims the benefit of the filing date of U.S. Provisional patent application Ser. No. 60/786,460 tiled on Mar. 28, 2006.

BACKGROUND OF THE INVENTION

1. Field of the Invention

This invention relates generally to audio devices and equipment, and more particularly to intelligent audio speakers. Embodiments of the present invention relate to the distribution and management of audio in residences and businesses utilizing infrastructures provided by a local area network, a wide area network, or a combination of the two. Various embodiments of the present invention can be utilized on a network based on any medium, wired or wireless, but will be described further here in relation to a broadband power line network and/or a local area network based on power line communication. Various embodiments of the present invention have uses in at least two areas: (1) a broadband power line access network that provides connectivity to homes, businesses, and other entities, and (2) a high-speed local area power line network in a home, business or other environment that provides connectivity among devices located within the environment. Embodiments of the present invention have use in any network utilizing digital music distribution, and/or a digital music application, and in some embodiments where enhanced ambiance capability and control are desired.

2. Description of Related Art

There exist today many types of packet-based communication networks, where data is exchanged among a number of devices, based primarily on the actions being performed at any one of the devices. In today's home entertainment and related networks, the data, or data patterns, can primarily be categorized into three main types; streamed, control and request, and content information. Streamed refers to audio and video data of various formats (MPEG1, MPEG2, MPEG3, AVI, etc.), control and request refers to data that relates to management and control of the audio and video streams, and content information refers to data related to the specifies of audio or video streams available on a network. The bulk, or largest portion, of the data being transmitted is usually streamed data (it should also be understood that streaming data could be represented by a sequence of packets). This streamed data is normally distributed to a number of devices, wherein both audio and video may be distributed to an Audio/Video device such as a TV or monitor, and audio only may be distributed to audio rendering devices such as speakers.

In recent years, there has been interest in connecting existing audio and video devices to such networks, and also to enhance the Audio/Video experience within such networks. The present invention not only solves the unmet need of connecting existing audio and video devices, for example, audio speakers, to such networks, additionally, in some embodiments, the novel use of ambiance effects to enhance the Audio/Video experience is also described. One such novel ambiance effect uses a backlighting arrangement that can be installed to an Audio/Video device, such as a TV or a speaker, and can project light whose characteristics, such as color or intensity, can be changed based on the particular video or sound that is being viewed or listened to. Some embodiments of the present invention contain this novel use of ambiance effects. In some embodiments of the present invention, a retrofit device is disclosed that converts an audio speaker into a networked device that can communicate over a power line network, receive digital distributed audio signals or packets, convert this digital data to analog audio signals, and, in some embodiments of the present invention, create enhanced ambient backlight effects based on data received, and in some embodiments, user input. In other embodiments of the present invention, a device is disclosed that is contained within, or otherwise electrically coupled to, an audio speaker that becomes a networked device that can communicate over a power line network, receive digital distributed audio signals or packets, convert this digital data to analog audio signals, and, in some embodiments of the present invention, create enhanced ambient backlight effects based on data received, and in some embodiments, user input.

It is an object of the present invention to provide an apparatus for connecting audio speakers to a digital network. It is another object of the present invention to provide an apparatus for connecting audio speakers to a digital network with enhanced ambient backlight effects. It is yet another object of the present invention to provide an apparatus that can be retrofit to existing audio speakers for connection to a digital network. It is yet another object of the present invention to provide an apparatus that can be retrofit to existing audio speakers for connection to a digital network with enhanced ambient backlight effects.

BRIEF SUMMARY OF THE INVENTION

In accordance with the present invention, there is provided an intelligent audio speaker comprising a power line communication element having a digital output, a digital to analog conversion element operatively coupled to the digital output of the power line communication element for converting a digital audio signal into an analog audio signal, an audio amplification element operatively coupled to said digital to analog conversion element, and an audio speaker driven by said audio amplification element.

The foregoing paragraph has been provided by way of introduction, and is not intended to limit the scope of the attached claims.

BRIEF DESCRIPTION OF THE DRAWINGS

The invention will be described by reference to the following drawings, in which like numerals refer to like elements, and in which.

Figure 1:
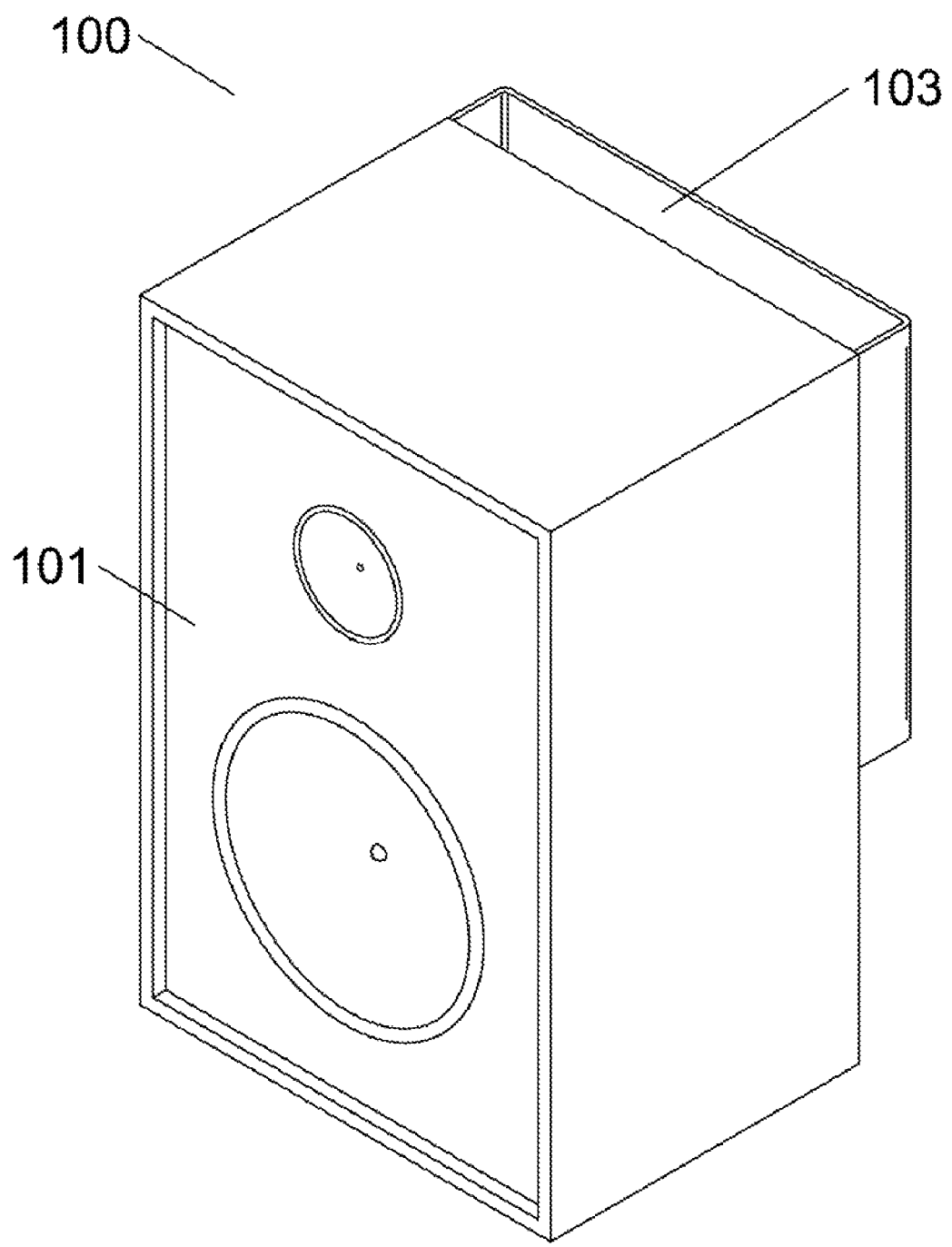
FIG. 1 is a front perspective view of an intelligent audio speaker showing the intelligent audio speaker control unit mounted to the back of the audio speaker.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the appended claims.

DESCRIPTION OF THE PREFERRED EMBODIMENTS

In digital audio distribution networks that are coming into use in homes, businesses, apartment complexes, and other residential buildings, streaming audio and multimedia content is sourced/originated, captured, stored, transmitted, received, and rendered through a number of devices located throughout the network. In these digital audio distribution networks, there has been an unmet need to convert an audio speaker into a networked device that can receive digital audio data and convert this data to analog signals that can then be used to drive the audio speaker. As will be described in the following description of the preferred embodiments of the present invention, the present invention and the various embodiments of the present invention described herein fulfill this unmet need. In some embodiments of the present invention, enhanced ambiance effects are created through the use of a light source that may, in some embodiments of the present invention, be multi color. The effects of light color and intensity may be set by user input in some embodiments of the present invention, or may in other embodiments of the present invention, be set to automatically adjust based on the audio signal or data being received. The overall types and parameters of these ambiance effects may be controlled and adjusted by user input through software or hardware. In one of the preferred embodiments described herein, retrofit devices for use on a local area or wide area broadband power line network are described. These devices enable legacy audio rendering devices to support distributed digital content, allow for remote control of devices, and in some embodiments of the present invention, enable enhanced ambiance backlight effects, including in some embodiments of the present invention, remote setup and control of these effects.

The various embodiments of the present invention described herein exemplify operation on an electrical power distribution network; It should be understood, however, that the present invention is applicable to a network based on any medium. Both wired and wireless networks, and derivatives, combinations and subcombinations thereof, may be used in the various embodiments of the present invention as further described herein.

For a general understanding of the present invention, reference is made to the drawings. In the drawings, like reference numerals have been used throughout to designate identical elements.

FIG. 1 is a front perspective view of an intelligent audio speaker showing the intelligent audio speaker control unit mounted to the back of the audio speaker 100. Referring to FIG. 1, an audio speaker 101 is depicted. The term audio speaker as used herein refers to either a single audio speaker or a plurality of audio speakers such as, for example, a cabinet containing a woofer, a tweeter, and a midrange frequency response speaker. FIG. 1 further depicts a control unit 103.

The control unit 103 contains circuitry for receiving distributed audio content by way of power lines and converting said audio content to an analog audio signal of sufficient amplitude to drive the audio speaker 101. The circuitry contained within the control unit 103 will be described further in this specification, and may, in some embodiments of the present invention, use system on a chip technologies. The control unit as depicted in FIG. 1 is mounted to the rear of an existing audio speaker 101. In some embodiments of the present invention, the control unit 103 is a retrofit kit that is attached to an existing audio speaker 101 to allow for the reception of audio content from power lines. Such a retrofit kit solves the unmet need of bringing audio into locations of a building that are difficult to wire with traditional analog speaker wire techniques. In other embodiments of the present invention, the control unit 103 is built into an audio speaker 101 either as an external structure appended to the audio speaker or as an integral unit contained within the audio speaker 101. The electronics contained within the control unit 103 will be further explained by way of FIGS. 6, 7 and 8 and the supporting descriptive and enabling text contained later in this specification.

Figure 2:
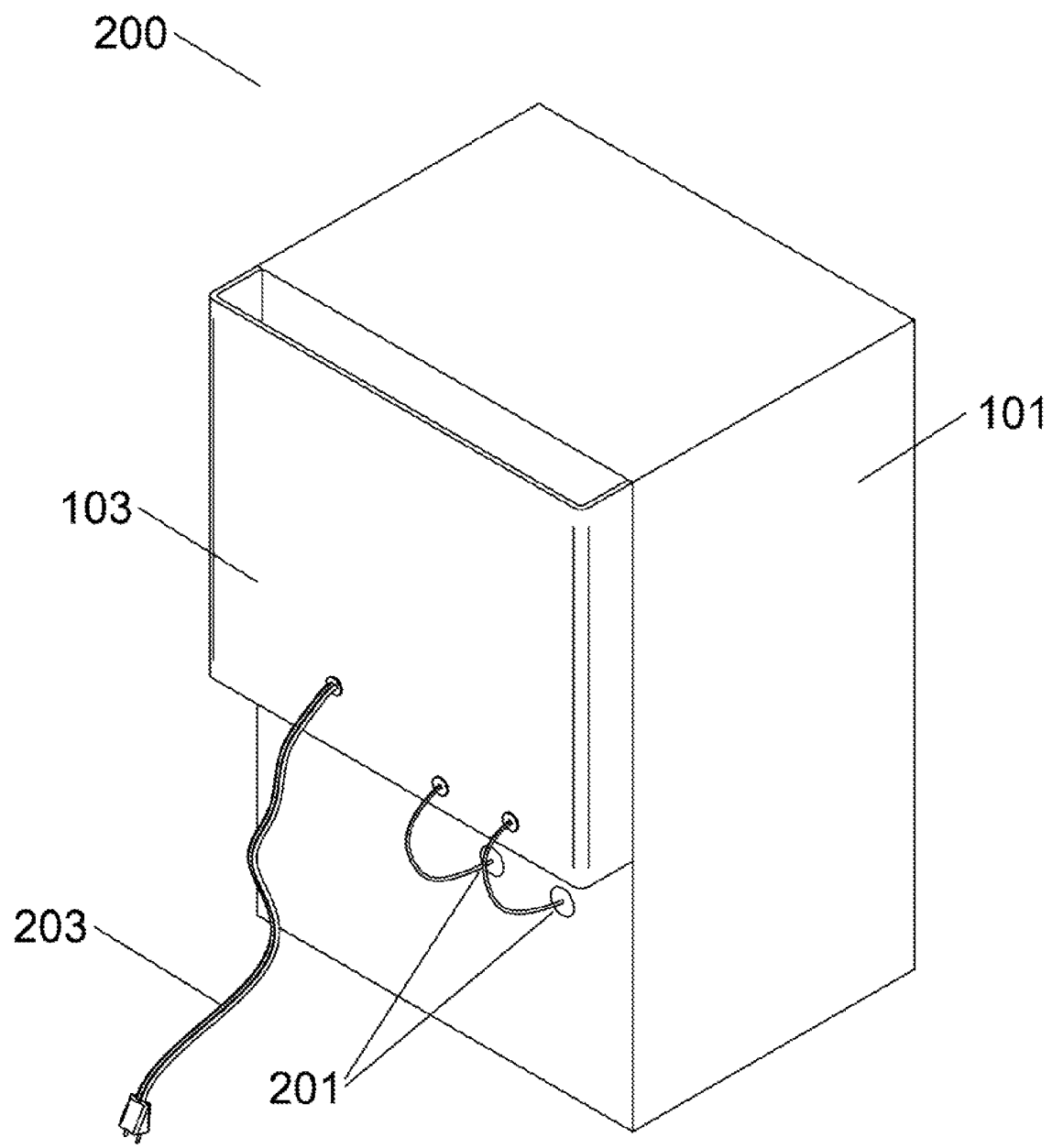
FIG. 2 is a rear perspective view of the intelligent audio speaker of FIG. 1.

Referring now to FIG. 2, a rear perspective view of the intelligent audio speaker of FIG. 1 is depicted. The audio speaker 101 can be clearly seen with the accompanying control unit 103. Further, a power cord 203 can be seen. The power cord 203 provides connectivity to power distribution in a building. Such connectivity provides power for the circuitry contained in the control unit 103 as well as the delivery of audio content through power line communication of digital audio data. Power line communication is described in U.S. Pat. No. 7,106,177 to Logvinov and Ebert, entitled "Method And System For Modifying Modulation Of Power Line Communications Signals For Maximizing Data Throughput Rate", the entire disclosure of which is incorporated herein by reference. FIG. 2 also shows a pair of audio speaker wires 201 connected between the control unit 103 and the audio speaker 101. The audio speaker wires carry analog audio signals from the output of the control unit 103 to the audio input of the audio speaker 101. It should be noted that in some embodiments where the control unit 103 is contained within the audio speaker 101, the audio speaker wires 201 may also be contained within the audio speaker 101.

Figure 3:
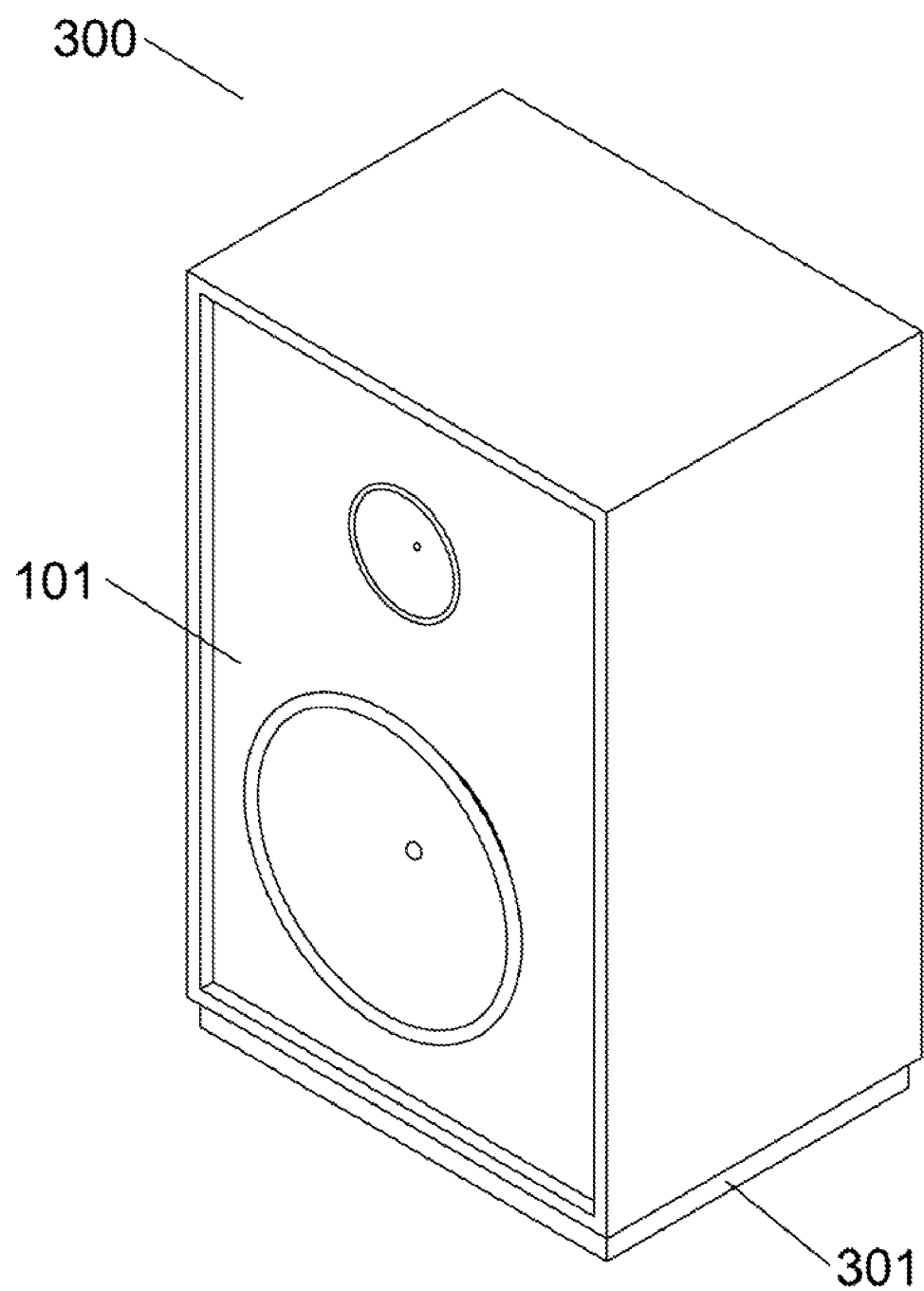
FIG. 3 is a front perspective view of an intelligent audio speaker showing the intelligent speaker control unit mounted to the bottom of the audio speaker.

Referring now to FIG. 3, another embodiment of the intelligent audio speaker 300 is depicted. In the embodiment depicted in FIG. 3, a bottom mount control unit 301 is shown attached to the bottom of an audio speaker 101. The bottom mount control unit 301 contains the same internal electronics as the control unit 103 previously depicted by way of FIG. 1, but has a physical geometry that allows for mounting on the bottom of an audio speaker.

Figure 4:
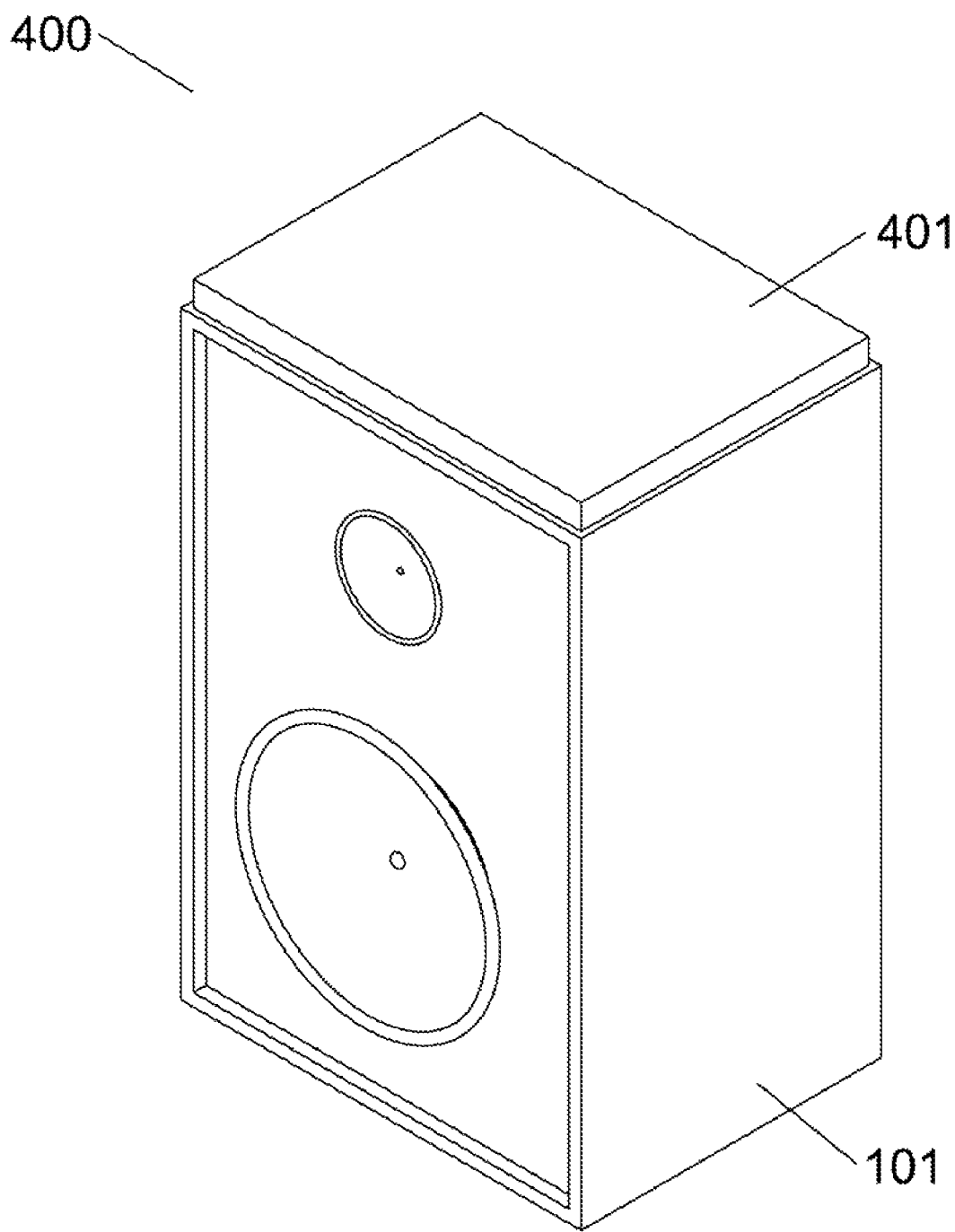
FIG. 4 is a front perspective view of an intelligent audio speaker showing the intelligent speaker control unit mounted to the top of the audio speaker.

Now referring to FIG. 4, another embodiment of the intelligent audio speaker 400 is depicted. In the embodiment depicted in FIG. 4, a top mount control unit 401 is shown attached to the top of an audio speaker 101. The top mount control unit 401 contains the same internal electronics as the control unit 103 previously depicted by way of FIG. 1, but has a physical geometry that allows for mounting on the top of an audio speaker. It should be further noted that alternative packaging of the control unit of the present invention would be within the skills and capabilities of one skilled in the art, and the scope of the present invention includes all modifications and variations to the physical packaging of the control unit of the present invention that would be known to one skilled in the art.

Figure 5:
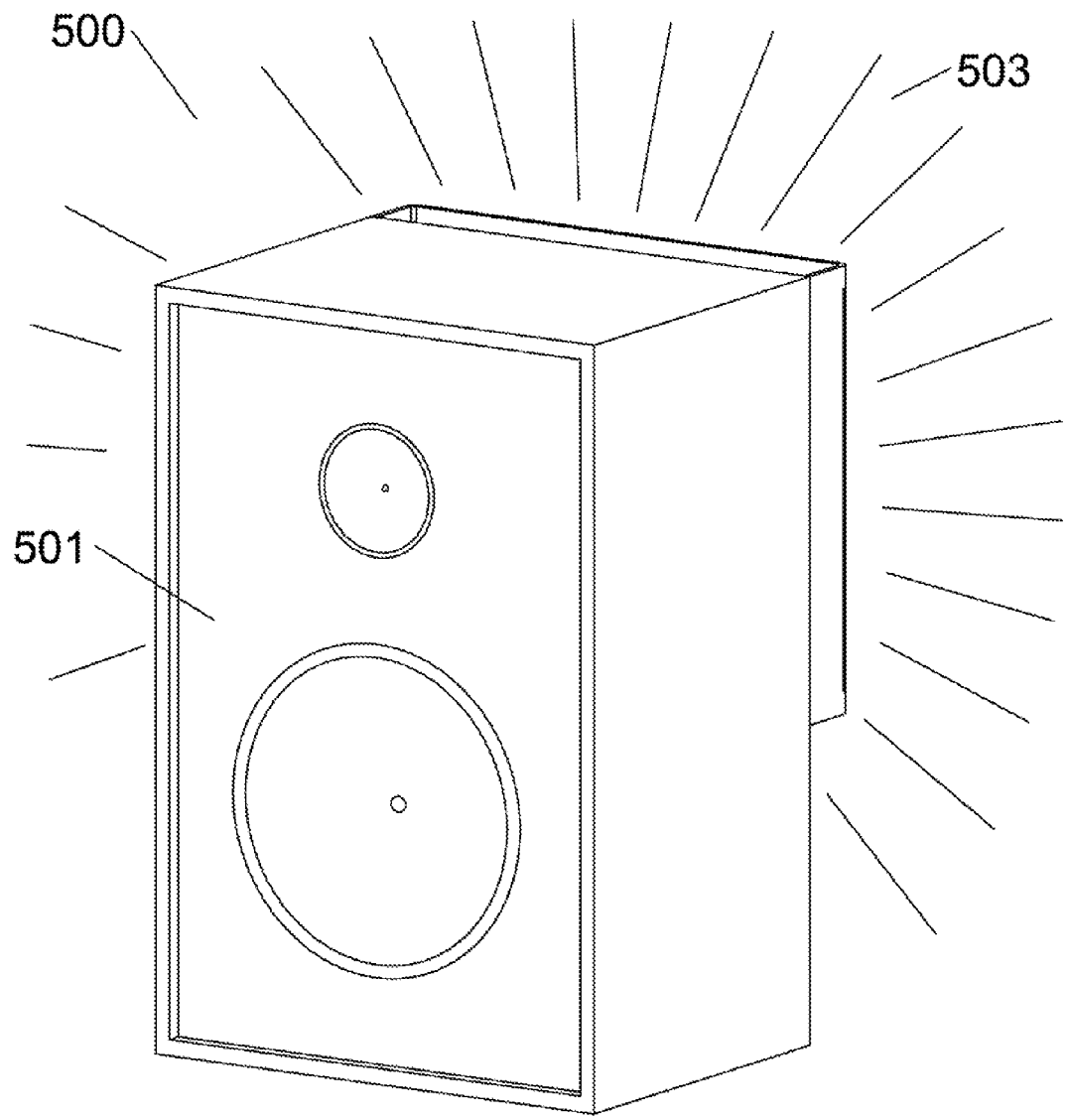
FIG. 5 is a perspective view of an intelligent audio speaker with the enhanced ambiance backlight effect.

FIG. 5 depicts an intelligent audio speaker with enhanced ambience backlight effect 500. In FIG. 5, an audio speaker 501 is depicted with the backlight effect 503. The backlight effect 503 is accomplished by way of an ambient light emitter element (not shown in FIG. 5). The ambient light emitter element will be described later in this specification and by way of FIG. 7. The backlight effect 503 is light that originates from the intelligent audio speaker 500. The light may modulate in intensity as the spectral content (including frequency and amplitude) of the audio changes with respect to time. In some embodiments of the present invention, the light may change color as the spectral content (including frequency and amplitude) of the audio changes with respect to time. Other variations of the backlight effect may include multiple color lights, lights that turn on and off, and the like.

Figure 6:
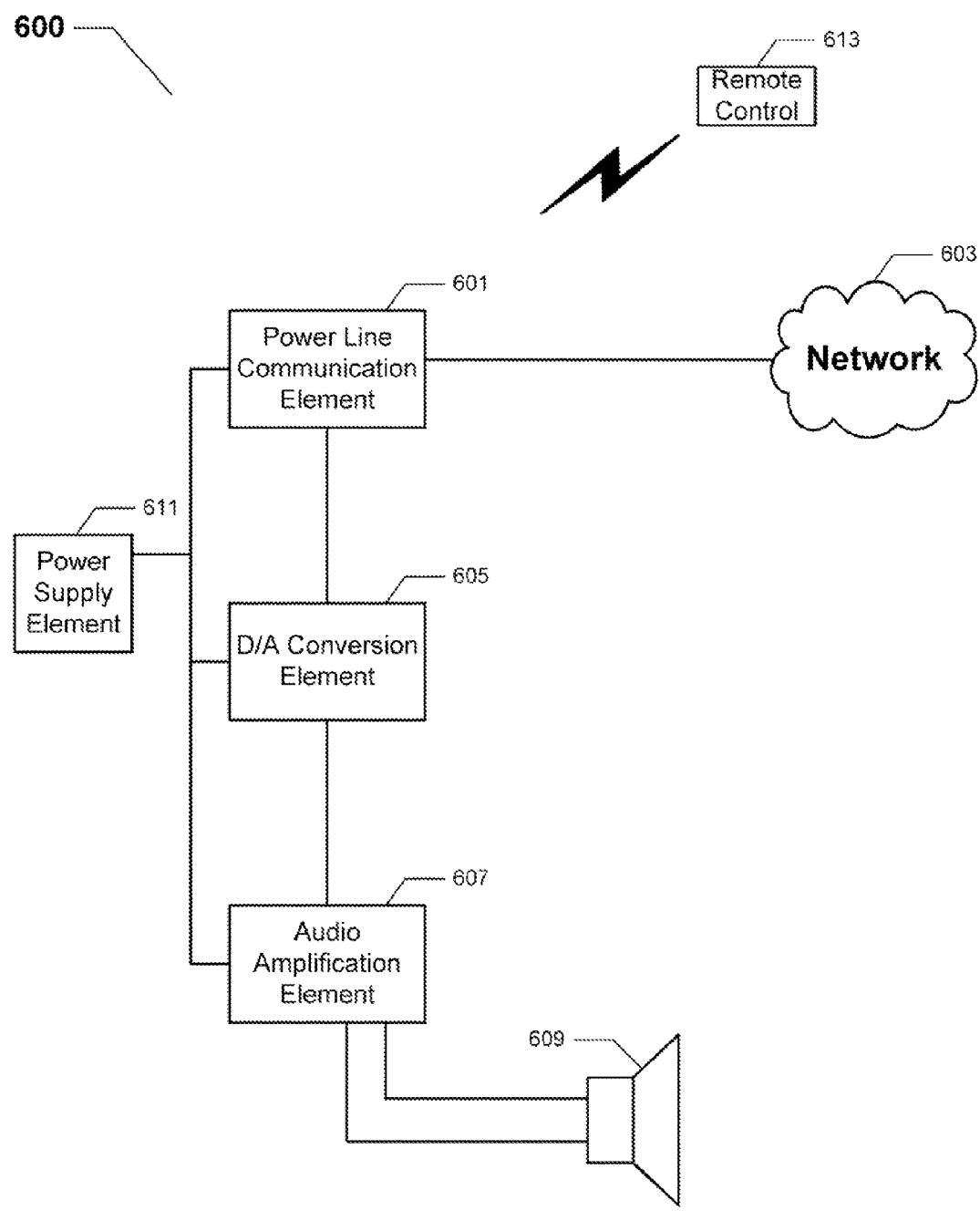
FIG. 6 is a block diagram showing the basic functional elements of the intelligent audio speaker.

Turning now to FIG. 6, a block diagram showing the basic functional blocks of the intelligent audio speaker is shown. It should be noted that the basic functional blocks of the intelligent audio speaker may be packaged in various ways such as discrete components, board level components, integrated components, or system on a chip components. Other forms of physical packaging and implementation will be known to those skilled in the art, and the various embodiments of the present invention are not intended to be limited to any one particular type of packaging and implementation. For example, system on a chip relates to technologies that integrate components of a system into a single integrated circuit. The system on a chip may contain analog, digital and radio frequency signals. System on a chip fabrication techniques are varied, and may include full custom designs where each individual transistor, devices, and related interconnects are laid out for fabrication. In addition, standard cell fabrication techniques, such as used in application specific integrated circuits, are used for some system on a chip designs. Standard cell fabrication techniques use cells or libraries of standard subcircuits that are later interconnected in a higher level design. In addition, system on a chip fabrication techniques may also include field programmable gate arrays where the logic functions of the chip are programmed using a large number of logic devices whose interconnects are specified after initial fabrication. In some embodiments, system in package techniques may be used where a number of chips are contained within a single package. There are many techniques available to package a number of chips in a single package, including, for example, hybrid circuit packaging techniques.

Referring again to FIG. 6, digital audio data is received from a network 603, such as a broadband network operating on power lines, to a power line communication element 601. Power line communication (PLC), also known by terms such as power line networking (PLN), mains communication, power line telecoms (PLT), powerband, or power area, networking (PAN), describe systems that use power distribution wires for distribution of data. These systems are carrier based, and work by superimposing a signal over the alternating current, which is commonly 50 or 60 hertz. These systems include both Broadband over Power Lines (BPL) and Narrowband over Power Lines. Power line communication systems use variations of orthogonal frequency division multiplexing (OFDM). Many commonly used Power Line Communications systems use a signal frame structure that includes a payload portion interposed between start and end delimiters.

Standards for Power Line Communications continue to evolve. An example of such evolution is the work of the IEEE working group P1901 in developing a standard for broadband power line communications. Many of the standards, modifications and improvements to Power Line Communications are driven by the harsh nature of the power line medium. Power lines represent a harsh environment for the transmission of data. Varying impedances, noise, time variant impedances, all represent challenges to data transmission. In addition, these environmental variables create the possibility of latency, something unacceptable to a listener of audio content. An example of techniques used to improve the quality of power line communications include U.S. Pat. No. 7,106,177 to Logvinov and Ebert, entitled "Method and System For Modifying Modulation of Power Line Communications Signals For Maximizing Data Throughput Rate", United States Patent Application Publication US2007/0022197 to Logvinov and Ebert entitled "Method And System For Distributed Audio With Location Based Control, Management, and Delivery", the entire disclosures of which are incorporated herein by reference. The present invention is not intended to be limited to a given standard for power line communications, but rather, includes all forms of power line communications and the resulting standards that are developed therefrom.

The power line communication element 601 depicted in FIG. 6 may use, in one embodiment of the present invention, orthogonal frequency division multiplexing (OFDM) as the basic transmission technique. Orthogonal frequency division multiplexing (OFDM) is known to those skilled in the art, and has been used in forms of power line communications as well as Digital Subscriber Line (DSL) communications. Digital Subscriber Line Communications has been described by Starr, Cioffi, and Silverman in "Understanding Digital Subscriber Line Technology", published by Prentice Hall in 1999. Orthogonal frequency division multiplexed waveforms are typically generated through the use of an inverse fast fourier transform (IFFT) where the frequency domain points are made up of a set of complex symbols that modulate each carrier. The end result of this inverse fast fourier transform process is an orthogonal frequency division multiplexed (OFDM) symbol. At a receiver, such as a receiver contained in the power line communication element 601 depicted in FIG. 6, the data can be recovered through the use of a fast fourier transform (FFT) and converted back to the frequency domain for later use in elements of the intelligent audio speaker of the present invention. In one embodiment of the present invention, the power line communication element 601 uses the Homeplug 1.0.1 standard, developed by the HomePlug Power line Alliance, a not for profit corporation established to provide a forum for the creation of open specifications for high speed home power line networking products and services. Information about the HomePlug Power line Alliance can be found at www.homeplug.org. HomePlug 1.0.1 uses orthogonal frequency division multiplexing (OFDM) in a burst mode rather than in a continuous mode. Homeplug 1.0.1 technology also uses concatenated Viterbi and Reed Solomon forward error correction (FEC) with interleaving for payload data, and turbo product coding (TPC) for sensitive control data fields. Home Plug 1.0.1 uses the media access control (MAC) protocol, a variation on carrier sense multiple access with collision avoidance (CSMA/CA). The HomePlug 1.0.1 data bearing packet contains a series of orthogonal frequency division multiplexed (OFDM) symbols containing a start-of-frame delimiter, a payload, and an end-of-frame delimiter. Frame control contains media access control (MAC) layer management information such as packet lengths, response status, and the like. The payload portion of the packet is carried on a set of carriers that have been previously determined during a channel adaptation procedure by the transmitter and intended receiver, such as the power line communication element 601 in FIG. 6. This payload portion is intended only for a specific destination receiver. The HomePlug 1.0.1 physical layer (PHY) occupies a frequency band from 4.5 Mhz to 2.1 Mhz. The HomePlug Power line Alliance is continuing to develop new and varying standards for power line communication, and the inventive concepts expressed herein are applicable to any device built to these standards. As noted previously, the use of the current and evolving Home-Plug standard is meant to provide teaching by way of example, and not limitation, sufficient to allow one skilled in the art to make and use the present invention. Other forms, versions, and improvements to power line communications are expected and included in the various embodiments of the present invention as described by way of this specification and the attached claims.

Referring again to FIG. 6 and the block diagram contained therein, digital audio signals are received from a network 603 by the power line communication element 601. In some embodiments of the present invention, a timing signal such as a global timing signal is passed from the network 603 to the power line communication element 601, or provided by way of the power line communication element 601, and converted from a digital signal to an analog signal by way of a digital to analog conversion element 605. The digital to analog conversion element 605 may, in some embodiments, be contained within the power line communication element 601. In other embodiments of the present invention, the digital to analog conversion element 605 is external to the power line communication element 601. In other embodiments of the present invention, a digital amplifier is employed that may contain an integral digital to analog conversion element, and may, in some embodiments of the present invention, take the place of the audio amplification element 607. A digital to analog converter takes a digital signal and converts it to an analog signal. Such devices are known in the art, and typically convert finite-precision numbers into an analog output signal. Most audio content is currently stored in digital form, and a digital to analog converter is required for the audio content to be heard through speakers requiring an analog signal. Various types of Digital to Analog (D/A) converters include Pulse Width Modulated digital to analog converters, oversampling digital to analog converters such as delta sigma, binary weighted digital to analog converters, R~2R ladder digital to analog converters, and the like. An example of audio digital to analog converters are the family of digital to analog converters made by Analog Devices, Inc. Examples include Analog Devices part number AD1955 Multibit Sigma-Delta D/A w/SACD Playback, Analog Devices part number AD1852 Stereo, 24-bit 192 kHz. Multibit Sigma-Delta D/A (voltage output). Analog Devices part number AD1854 Complete Single Chip Stereo Audio D/A, and the like. Other Digital to Analog Converters available from other manufacturers may also be used.

Once the digital audio content is received by the power line communication element 601 and converted to an analog audio signal 605 by way of a digital to analog conversion element 605, the analog audio signal is then amplified by way of an audio amplification element 607. The audio amplification element 607 amplifies low power audio signals received from the digital to analog conversion element 605. Audio signals include primarily frequencies between 20 hertz and 20,000 hertz, which is the range of human hearing. The amplified audio signals of the audio amplification element 607 are suitable for driving audio speakers, which are most commonly the final stage in an audio content delivery system. The audio amplification element 607 may contain an audio amplifier as well as, in some embodiments of the present invention, filters, pre-amplifiers, equalizers, tone controls, mixing and effects, or digital signal processing enhancements. An example of such digital signal processing enhancements is the line of Spider series amplifiers manufactured by Line6 of Calabasas, Calif. (www.line6.com). Audio amplifiers that may be used in the audio amplification element 607 include all forms of discrete silicon, integrated silicon, analog, digital, as well as vacuum tube technologies. Integrated circuits are readily available for the purpose of constructing a suitable audio amplification element, such as the amplifier integrated circuits manufactured, by National Semiconductor, for example, the LM48XX series integrated circuit amplifiers by National Semiconductor. In addition, discrete component amplifiers using power transistors, Bipolar junction transistors, Field effect transistors, high gain darlington pairs, and the like, may also be used in the audio amplification element 607. Amplifier stages may include class A, class B, class AB, and the like. The term audio amplification element includes not only the audio amplifier itself, but also components that work in compliment with the audio amplifier, such as, for example, filters, equalizers, digital signal processors, negative feedback loops, crossover circuits, special effects, and the like.

Figure 7:
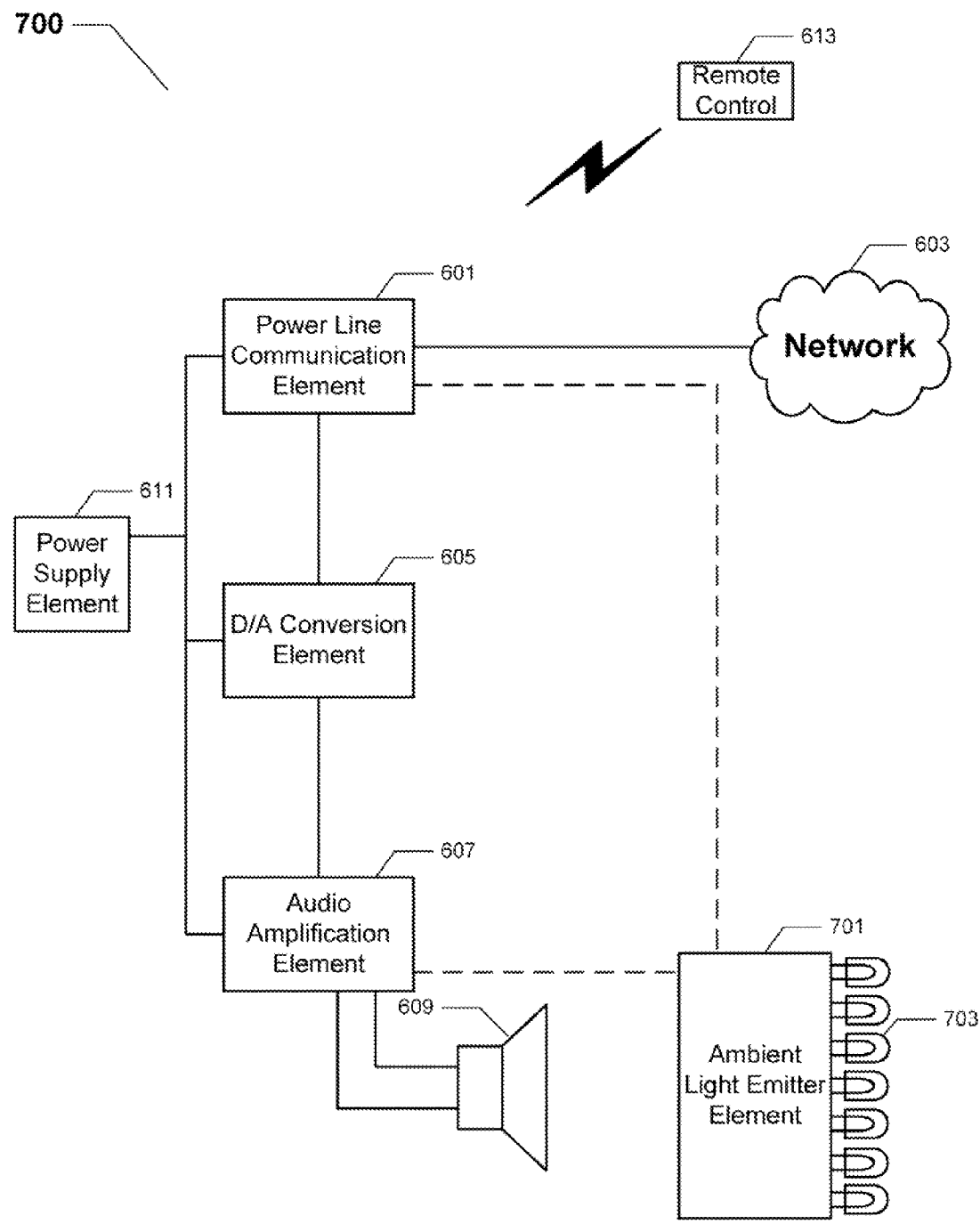
FIG. 7 is a block diagram showing the basic functional elements of the intelligent audio speaker with an ambient light emitter element.
Figure 8:
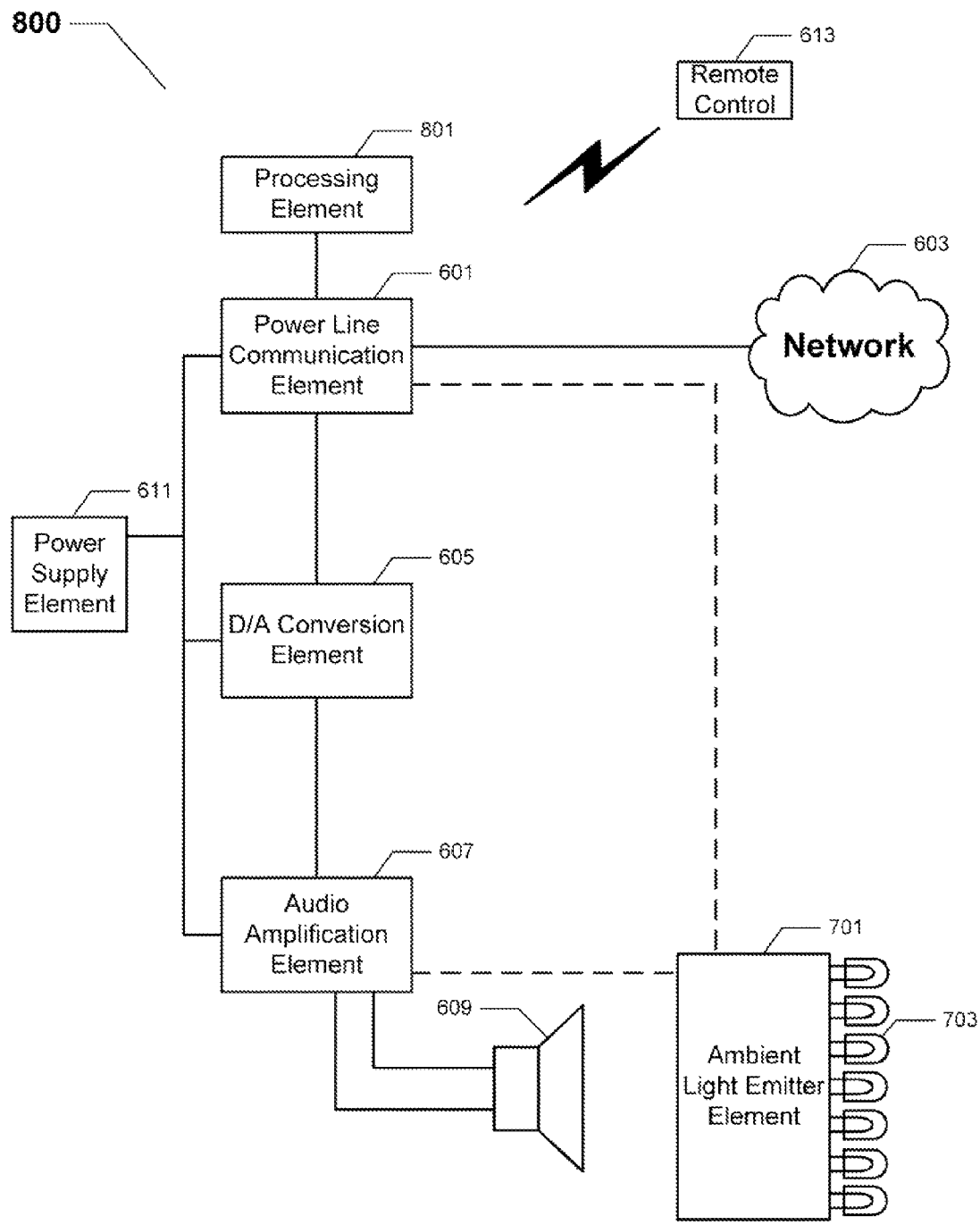
FIG. 8 is a block diagram showing the basic functional elements of the intelligent speaker with an ambient light emitter element and with a processing element.

FIG. 6 also shows a power simply element 611 that converts alternating current power to direct current that is suitable for use by the various elements of FIGS. 6, 7 and 8. Power supplies are known to those skilled in the art. Reference may be had, for example, to power supplies manufactured by Astec Power (www.astec.com). Other power supplies known to those skilled in the art may also be used. Lastly, in FIG. 6, an audio speaker 609 is depicted. The audio speaker 609 is driven from the audio amplification element 607. FIG. 6 shows a single audio speaker in block diagram form, and may include, in some embodiments of the present invention, multiple speakers such as a tweeter, woofer, midrange, horn, and the like. Speakers are commonly electromechanical devices that convert an electrical signal into sound. There are many types of speakers that use the moving coil effect, the cone speaker being the most common. Other types of audio speakers include the piezoelectric speaker, plasma arc speakers, Heil air motion transducers, electrostatic loudspeakers, and the like.

FIG. 7 is a block diagram of the basic functional elements of the intelligent audio speaker with an ambient light emitter element. An ambient light emitter element 701 is present in some embodiments of the present invention. The purpose of the ambient light emitter element 701 is to provide a novel and unique audio listening experience by way of light being aesthetically displayed in proximity to the intelligent audio speaker. The light may modulate in intensity as the spectral content (including frequency and amplitude) of the audio changes with respect to time. In some embodiments of the present invention, the light may change color as the spectral content of the audio changes with respect to time. Other variations of the backlight effect may include multiple color lights, lights that turn on and off, and the like. The ambient light emitter element 701 contains circuitry that allows an audio output signal from the audio amplification element 607 (shown as a dotted line) or one or more control output signals from the power line communication element 601 (also shown as a dotted line) to modulate a lamp or lamps 703 in amplitude, frequency, color, or a combination thereof. The modulation may, in some embodiments, be controlled by a user, by way of, for example, a remote control unit 613. In this embodiment, the remote control codes would be interpreted by the power line communication element 601, and resulting control signals would be sent to the ambient light emitter element 701. The lamps 703 may also, in some embodiments of the present invention, represent different colors or may change colors with respect to time or frequency. Compensation for inherent startup delays in some lamps is done by way of timing circuitry that includes, for example, capacitive coupling to minimize delays between the audio output signal and the illumination of the lamps. Lamps may include incandescent, filament, fluorescent, gas discharge, neon, light emitting diode, electroluminescent, laser, and the like. The modulation of the lamps in the ambient light emitter element 701 is accomplished, in some embodiments of the present invention, by way of an analog driver circuit such as an amplifier. An example of such a circuit would be a class A audio amplifier using two NPN transistors such as 2N4401 series transistors with the collectors tied together and the base of the first transistor receiving an audio input signal through an input capacitor and resistor. An NPN power darlington transistor with the base input tied to the collector of the second 2N4401 or similar transistor is used to drive the lamp 703 in modulation with the input audio signal. This circuit is set forth by way of example, and not limitation. Other driver circuits known to those skilled in the art may be used. In addition, in some embodiments of the present invention, multiple driver circuits may be used with various bandpass, bandstop, or notch filters to drive a series of lamps 703, using, for example, different colors to represent different frequency ranges. In yet another embodiment, integrated circuits that are designed to drive one or more LEDs, or other illumination devices, such as devices from Fairchild Semiconductor (www.fairchildsemi.com), may be used, with control signaling for the device being generated from the power line communication element 601.

Referring now to FIG. 8, a block diagram of the basic functional elements of the intelligent audio speaker with an ambient light emitter element and with a processing element is shown. The processing element 801 is connected to the power line communication element 601 in some embodiments of the present invention, and serves to provide additional control to the intelligent audio speaker. This control may include additional user defined parameters, and may, in some embodiments of the present invention, be accessed by way of a remote control 613. The processing element 801 may include a microprocessor and memory, and may execute commands such as software routines, and may, in some embodiments of the present invention, allow updates and changes to the software routines by way of the power line communications network.

Figure 9:
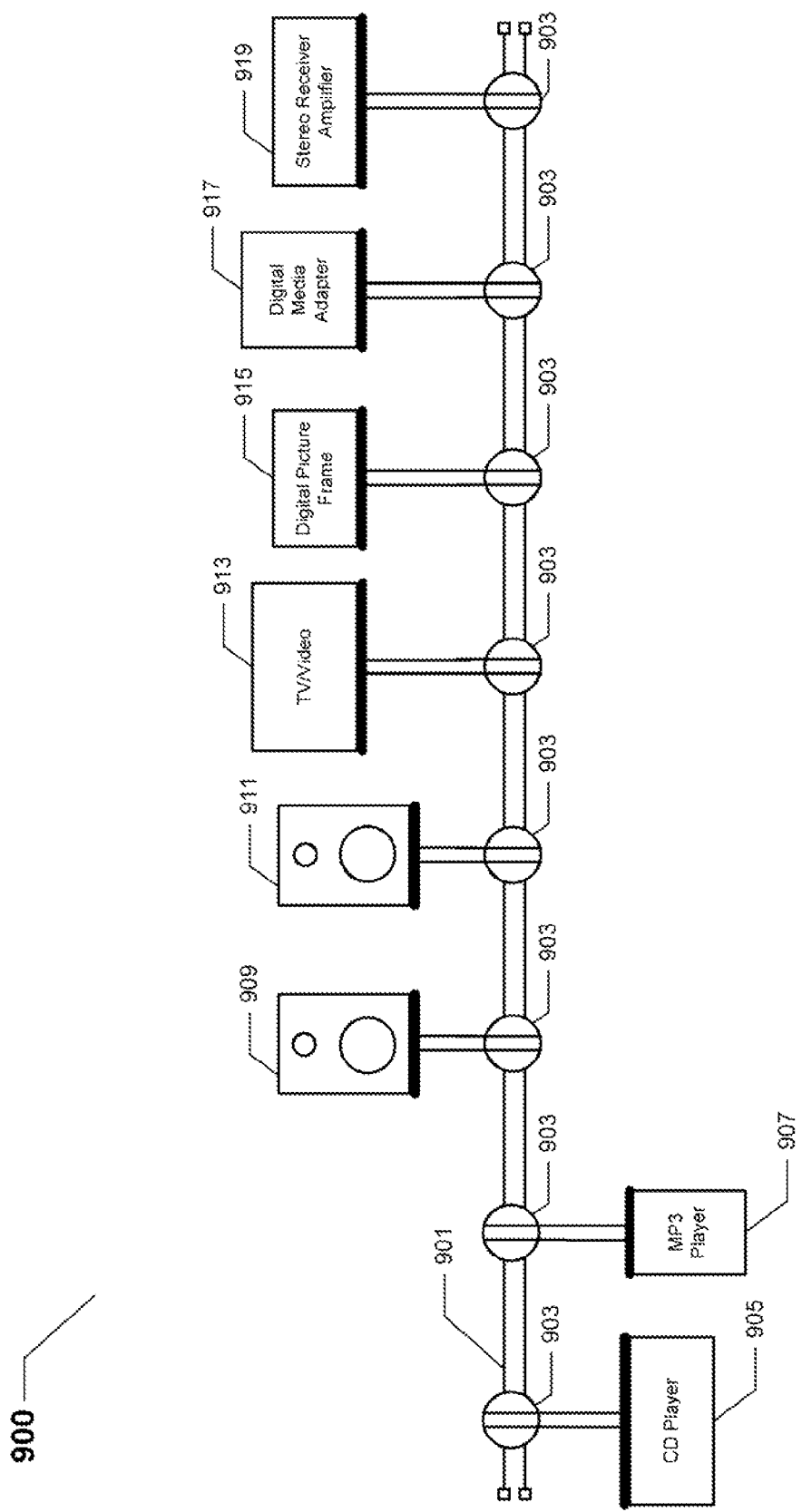
FIG. 9 is a diagram of a typical audio/video distribution network using power line communications.

FIG. 9 is a diagram of a typical audio/video distribution network using power line communications. Power lines 901 are depicted with receptacles 903, such as, for example, the electrical receptacles manufactured by Leviton, such as a NEMA 5-15R, 15 amp, 125 volt, Decora Plus Duplex receptacle. Sources of audio content in FIG. 9 include a Compact Disc Player 905, an MP3 Player 907, and the like. Each of these source devices contains a power line communication element that provides the intermediary between the audio signal and the power line network. Receivers of the audio content include intelligent speakers 909 and 911, as described herein. In addition, combined audio and video may be distributed by way of a power line communication network. Depicted in FIG. 9 by way of example, and not limitation, are a TV/Video 913, a digital picture frame 915, a digital media adapter 917, and a stereo receiver amplifier 919. FIG. 9 is provided by way of example and to assist with an understanding of how the present invention may be used. Devices connected to a power line communication network may vary based on the interests of the user, and such variation does not in any way depart from the spirit and broad scope of the present invention as described in this specification and the attached claims.

It is, therefore, apparent that there has been provided, in accordance with the various objects of the present invention, an apparatus for connecting audio speakers to a digital network. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the appended claims.

What is claimed is:

1. An intelligent audio system comprising:
a unit comprising:
    a processing element for processing digital data and controlling functions within the intelligent audio system;
    a power line communications element operatively coupled to the processing element, wherein the power line communications element has a digital output;
    a digital to analog conversion element operatively coupled to the digital output of the power line communications element for converting a digital audio signal to an analog audio signal;
    an audio amplification element operatively coupled to the digital to analog conversion element; and
    an audio speaker driven by the audio amplification element; and
    an ambient light emitter element configured to provide ambiance enhancing lighting for a surrounding area, wherein the ambient light emitter element is mounted to the unit.

2. The intelligent audio system of claim 1 further comprising of a remote control element configured to communicate to the power line communications element, wherein the communication controls the ambient light emitter element.

3. The intelligent audio system of claim 1 further comprising:
an audio management engine; and
an audio rendering engine.

4. The intelligent audio system of claim 3 further comprising a digital rights management element configured to enforce usage restrictions of the digital audio signal.

5. The intelligent audio system of claim 3 further comprising storage of one or more user profiles, wherein a user profile comprises of records of parameters of the digital audio signal requested by a user.

6. The intelligent audio system of claim 5, wherein the system is configured to suggest future selections of digital audio data based on the user profile.

7. The intelligent audio system of claim 1 further comprising a box surrounding the unit.

8. The intelligent audio system of claim 7, wherein the ambient light emitter is mounted to a top surface of the box.

9. The intelligent audio system of claim 7, wherein the ambient light emitter is mounted to a back surface of the box.

10. The intelligent audio system of claim 7, wherein the ambient light emitter is mounted to a bottom surface of the box.

11. The intelligent audio system of claim 1, wherein the processing element comprises one or more processors configured to execute instructions.

12. The intelligent audio system of claim 1, wherein the ambient light emitter element is controlled by the output from the audio amplification element.

13. The intelligent audio system of claim 1, wherein the ambient light emitter element is controlled by the power line communications element.

14. The intelligent audio system of claim 1, wherein the ambient light emitter element is controlled by spectral information of the digital audio signal.

15. The intelligent audio system of claim 1, wherein the ambient light emitter element is controlled by spectral information of the analog audio signal.

16. The intelligent audio system of claim 1, wherein the ambient light emitter element is controlled by user input.

17. The intelligent audio system of claim 1, wherein the ambient light emitter element comprises light emitting diodes.

18. The intelligent audio system of claim 1, wherein the ambient light emitter element comprises filament lamps.

19. The intelligent audio system of claim 1, wherein the ambient light emitter element comprises gas discharge lamps.

20. A intelligent audio system speaker comprising:
a retrofit kit enclosure configured to be mounted to a conventional audio speaker enclosure, the retrofit kit enclosure comprising:
a processing element for processing digital data and controlling functions within the intelligent audio system;
a power line communications element operatively coupled to the processing element, wherein the power line communications element has a digital output;
a digital to analog conversion element operatively coupled to the digital output of the power line communications element for converting a digital audio signal to an analog audio signal;
an audio amplification element having an input and an output, the input being operatively coupled to said digital to analog conversion element and the output being electrically connected to the conventional audio speaker; and
an ambient light emitter element configured to provide ambiance enhancing lighting for a surrounding area, wherein the ambient light emitter element is mounted to the retrofit kit enclosure.

21. The intelligent audio system of claim 20 further comprising of a remote control element configured to communicate to the power line communications element, wherein the communication controls the ambient light emitter element.

22. The intelligent audio system of claim 20 further comprising the conventional audio speaker enclosure.

23. The intelligent audio system of claim 20 further comprising:
an audio management engine; and
an audio rendering engine.

24. The intelligent audio system of claim 23 further comprising a digital rights management element configured to enforce usage restrictions of the digital audio signal.

25. The intelligent audio system of claim 23 further comprising storage of one or more user profiles, wherein a user profile comprises of records of parameters of the digital audio signal requested by a user.

26. The intelligent audio system of claim 25, wherein the system is configured to suggest future selections of digital audio data based on the user profile.

27. The intelligent audio system of claim 20, wherein the processing element comprises one or more processors configured to execute instructions.

28. The intelligent audio system of claim 20, wherein the ambient light emitter element is controlled by the output from the audio amplification element.

29. The intelligent audio system of claim 20, wherein the ambient light emitter element is controlled by the power line communications element.

30. The intelligent audio system of claim 20, wherein the ambient light emitter element is controlled by spectral information of the digital audio signal.

31. The intelligent audio system of claim 20, wherein the ambient light emitter element is controlled by spectral information of the analog audio signal.

32. The intelligent audio system of claim 20, wherein the ambient light emitter element is controlled by user input.

33. The intelligent audio system of claim 20, wherein the ambient light emitter element comprises light emitting diodes.

34. The intelligent audio system of claim 20, wherein the ambient light emitter element comprises filament lamps.

35. The intelligent audio system of claim 20, wherein the ambient light emitter element comprises gas discharge lamps.

36. The intelligent audio system of claim 20, wherein the ambient light emitter is mounted to a top surface of the retrofit kit enclosure.

37. The intelligent audio system of claim 20, wherein the ambient light emitter is mounted to a back surface of the retrofit kit enclosure.

38. The intelligent audio system of claim 20, wherein the ambient light emitter is mounted to a bottom surface of the retrofit kit enclosure.

39. An audio system comprising:
a first enclosure comprising:
a power line communication module configured to receive digital audio data;
a processing module communicably coupled to the power line communication module;
a digital to analog converter communicably coupled to the power line communication module;
an audio amplifier communicably coupled to the digital to analog converter element;
an audio output port communicably coupled to the audio amplifier; and
an ambient light emitter module configured to provide aesthetic lighting in a surrounding area of the first enclosure, wherein the ambient light emitter is mounted to an exterior surface of the first enclosure.

40. The audio system of claim 39 further comprising:
a second enclosure comprising:
an audio input port, wherein the audio input port is communicably coupled to the audio output port; and
one or more audio speakers, wherein the audio speakers are communicably coupled to the audio input port.

41. The audio system of claim 39 further comprising of a remote control module configured to communicate to the power line communications module, wherein the communication controls the ambient light emitter module.

42. The audio system of claim 39 further comprising:
an audio management engine; and
an audio rendering engine.

43. The audio system of claim 39 further comprising a digital rights management element configured to enforce usage restrictions of the digital audio data.

44. The audio system of claim 39 further comprising storage of one or more user profiles, wherein a user profile comprises of records of parameters of the digital audio data requested by a user.

45. The audio system of claim 44, wherein the system is configured suggest future selections of digital audio data base on the user profile.

46. The audio system of claim 39, wherein the processing module comprises one or more processors configured to execute instructions.

47. The audio system of claim 39, wherein the ambient light emitter module is controlled by the output from the audio amplifier.

48. The audio system of claim 39, wherein the ambient light emitter module is controlled by the power line communications module.

49. The audio system of claim 39, wherein the ambient light emitter module is controlled by spectral information of the digital audio data.

50. The audio system of claim 39, wherein the ambient light emitter module is controlled by user input.

51. The audio system of claim 39, wherein the ambient light emitter module comprises light emitting diodes.

52. The audio system of claim 39, wherein the ambient light emitter module comprises filament lamps.

53. The audio system of claim 39, wherein the ambient light emitter module comprises gas discharge lamps.

54. The audio system of claim 39, wherein the ambient light emitter module is mounted to a top surface of the first enclosure.

55. The audio system of claim 39, wherein the ambient light emitter module is mounted to a back surface of the first enclosure.

56. The audio system of claim 39, wherein the ambient light module is mounted to a bottom surface of the first enclosure.

* * * * *